United States Patent
Ayanoglu et al.

[11] Patent Number: 6,058,422
[45] Date of Patent: *May 2, 2000

[54] WIRELESS INTERNET ACCESS SYSTEM

[75] Inventors: Ender Ayanoglu, Red Bank; Kai Yin Eng, Middletown; Mark John Karol, Fair Haven; Pramod Pancha, Somerset, all of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/714,902

[22] Filed: Sep. 17, 1996

[51] Int. Cl.[7] ...................................................... G06F 13/00
[52] U.S. Cl. ........................................... 709/226; 709/229
[58] Field of Search ..................................... 370/404, 331, 370/338, 313, 312; 709/253, 200, 226, 229

[56] References Cited

U.S. PATENT DOCUMENTS

| | | | |
|---|---|---|---|
| 5,068,916 | 11/1991 | Harrison et al. | 455/39 |
| 5,159,592 | 10/1992 | Perkins | 370/338 |
| 5,210,753 | 5/1993 | Natarajan | 370/338 |
| 5,327,554 | 7/1994 | Palazzi, III et al. | 348/13 |
| 5,442,633 | 8/1995 | Perkins et al. | 370/331 |
| 5,490,139 | 2/1996 | Baker et al. | 370/312 |
| 5,586,121 | 12/1996 | Moura et al. | 370/404 |
| 5,673,322 | 9/1997 | Pepe et al. | 380/49 |
| 5,708,655 | 1/1998 | Toth et al. | 370/313 |
| 5,729,549 | 3/1998 | Kostreski et al. | 370/522 |

*Primary Examiner*—Meng-Ai T. An
*Assistant Examiner*—El-Hady Nabil

[57] ABSTRACT

A facility is provided for establishing a relatively low-speed path from a user desiring to access the well-known Internet and establishing a high-speed path from the Internet to the user so that the data speed accommodates both the user's requests and a response from an Internet web/host site. Moreover, a user may be mobile, in which case the low-speed path is a conventional wireless path. In most cases, a predetermined spectrum of frequencies, such as one or more television channels, is used as the high-speed path from Internet.

8 Claims, 3 Drawing Sheets

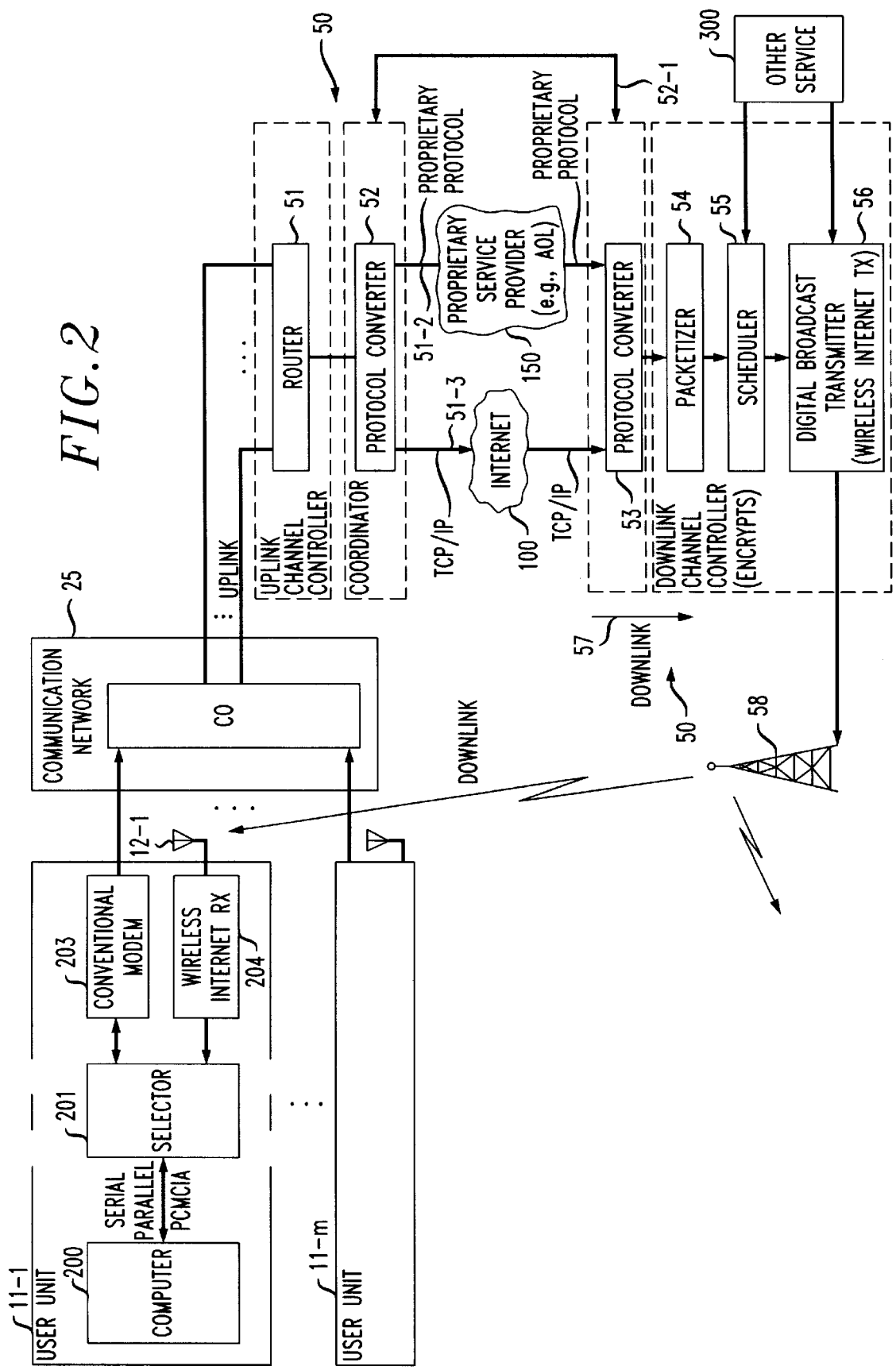

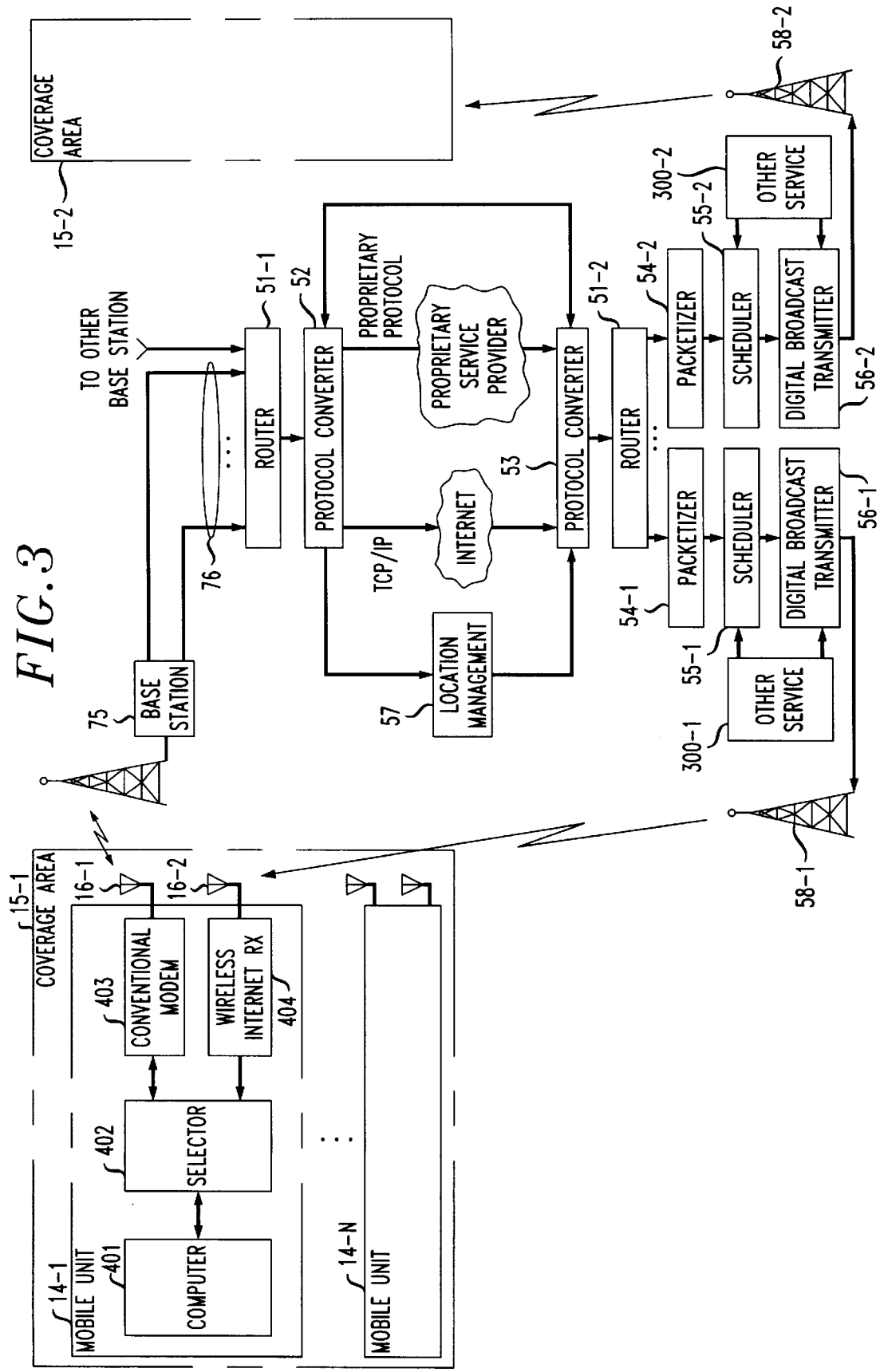

WIRELESS INTERNET ACCESS SYSTEM

FIELD OF THE INVENTION

The invention relates to accessing the well-known Internet and more particularly relates to accessing the Internet via a wireless medium.

BACKGROUND OF THE INVENTION

Currently, a user accesses the Internet via a telephone connection, which involves, in most cases, a 28.8 kbps modem interface between the user and the Internet. Users who interact with the Internet via 28.8 kbps modem that interfaces with a telephone connection generally agree that such an interface is indeed slow in terms of transferring data from the Internet to the user. Alternatively, a user may access the Internet using a higher data rate interface commonly referred to as a digital subscriber loop, e.g., ISDN, HDSL, ADSL, VDSL, etc. The latter technology provides data rates approaching six megabits per second. However, it is expensive, much more so than the slower and less costly 28.8 kbps interface. Herein lies the nub of the problem—namely, that data rates are somewhat proportional to cost. Ideally, then, an Internet interface should be both fast and relatively inexpensive.

SUMMARY OF THE INVENTION

We have recognized that the above mentioned problems may be dealt with by providing a hybrid arrangement which, in accord with an aspect of the invention, interfaces a user with the Internet via a relatively low speed upstream path, e.g., a 28.8 kbps path, and interfaces the Internet with the user via a relatively high speed downstream path, e.g., one or more television broadcast channels.

Specifically, in accordance with our invention, a system interfaces user apparatus with a data network interconnecting a plurality of host sites via an upstream link path from the user and supplying information originated by the user to one of said host sites identified in said information. Upon receipt of a response from the host site, associating the response with the user's address and reformatting the resulting response in accordance with a predetermined protocol. Transmission apparatus selected as a function of the user's address is then used to transmit the reformatted response over a predetermined spectrum of frequencies.

In accord with an aspect of the invention, a user may be a mobile user in which the selected apparatus is an antenna whose coverage includes the mobile user.

These and other aspects of our invention will be appreciated from the following general description and detailed description as well as the accompanying claims.

BRIEF DESCRIPTION OF THE DRAWING

In the drawing:

FIG. 2 is a more detailed block diagram of the system of FIG. 1; and

FIG. 3 illustrates the system of FIG. 2 arranged to process requests from mobile users.

GENERAL DESCRIPTION

Figure 1:
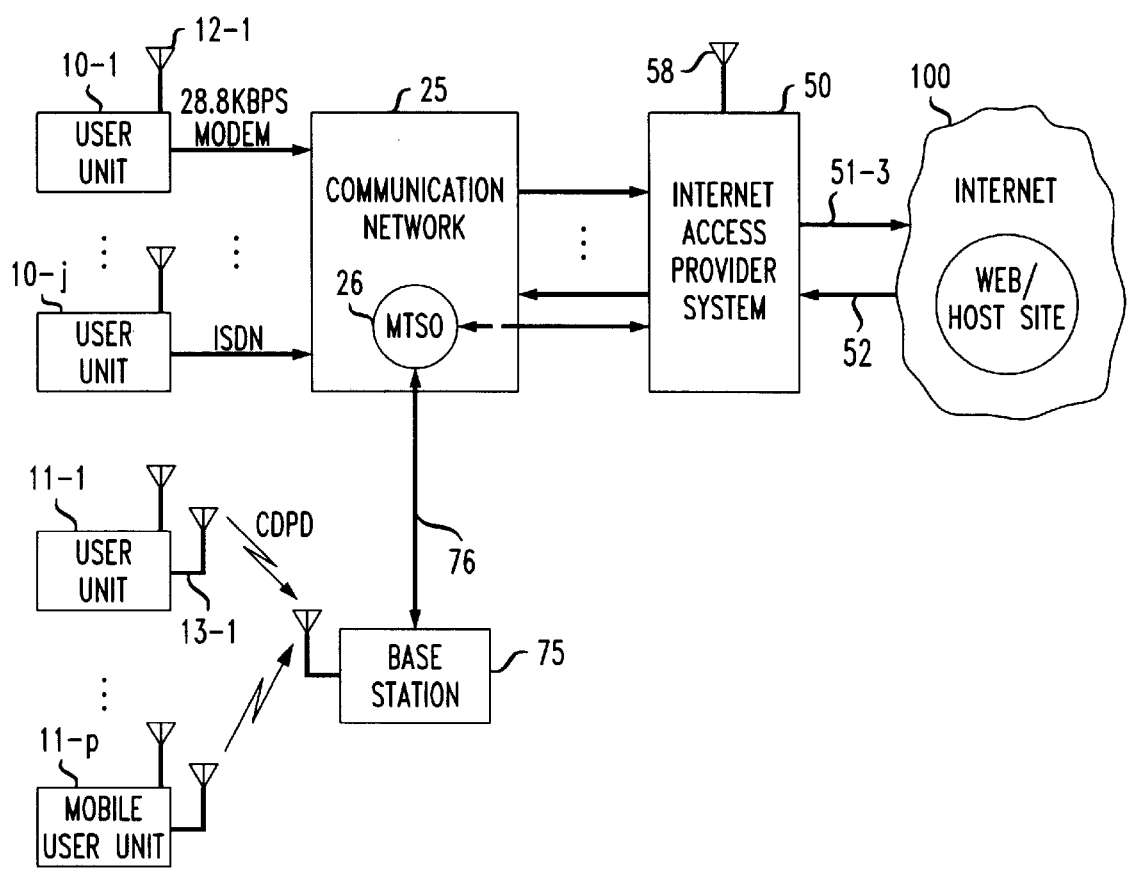
FIG. 1 is a broad block diagram of a system in which the principles of the invention may be practiced.

As is shown in FIG. 1, a first group of users (user units) 10-1 and 10-j may access the well-known Internet via a respective telephone connection, e.g., 28.8 kbps modem, ISDN, HDSL, ADSL, VDSL, etc., extending to a conventional communications system 25, e.g., the Public Switched Telephone Network (PTSN), which then extends such a connection to Internet access provider 50. In accord with an aspect of the invention, a telephone connection is used as an uplink for delivering commands entered by a user, e.g., user 10-1, and addressed to a particular Internet web site. Provider 50 collects each such command and transmits it via path 51-3 to the identified web site via Internet 100, in which the command includes the respective addresses of the destination (web site address) and originator of the command (access provider). The web site generates a response to the command and then transmits the response via Internet 100 to the originator's (return) address contained in the received command. As is well-known, such a response may constitute a very large number of data bytes (mega bytes of data) which the well-known TCP/IP protocol suite at the web site transmits as a sequence of data packets in which a data packet may contain up to about 65,000 bytes of data. Upon receipt of a TCP/IP formatted data packet from the Internet via path 52, access provider 50 converts the format of a received data packet so that it conforms with a particular protocol, e.g., the ATM data packet protocol. Access provider 50 then stores the resulting packet(s) (as will be discussed below) in a queue in association with the address of the user that requested the data. A scheduler (not shown) contained in access provider 50 then schedules the delivery of such queued packets in accordance with a respective level of "quality of service" subscribed to by the users, as will be explained below. When the scheduler unloads a queued data packet it processes the data packet for wireless transmission via broadcast antenna 58. The data content (payload) of the packet may be encrypted in accord with an encryption key known only to the sender and receiver. When the packet is transmitted in a digital wireless format over a particular spectrum of frequencies, e.g., predetermined television channels, it is received by all of the users that subscribe to the inventive access system via their respective antennas, e.g., antenna 12-1. However, the packet is accepted by only the user whose address is contained in the transmitted packet. At that point, the data in the packet may be processed in a conventional manner, e.g., displayed on the display of the user's computer.

Alternatively, the uplink connection between a user and Internet access provider may be a wireless/cellular connection as is shown for the group of users 11-1 through 11-p. In particular, a user, e.g., user unit 11-1, transmits Internet access commands over its associated antenna 13-1 in a predetermined data format, e.g., the well-known Cellular Digital Packet Data (CDPD) format. Base station 75 serving the coverage area in which the users 11-1 through 11-p are located receives the data via its associated antenna. Base station 75 then sends the data via path 76 to conventional MTSO 26 for presentation to Internet Access Provider 50 (hereinafter also IAP 50). IAP 50 then reformats the data (command/request) for transmission to the identified web/host site over Internet 100. IAP 50 also transports responses received from the host site/Internet to base station 75 via MTSO 26 and path 76. Base station 75, in turn, reformats the data into a form expected by the user unit identified in the response received via path 76, and transmits the reformatted data over its associated antenna. Alternatively, base station 75 may be arranged to provide a direct digital data service between itself and IAP 50, thereby bypassing network 25.
Detailed Description:

FIG. 2 illustrates a more detailed version of the system of FIG. 1. However, for the sake of clarity and brevity only one user unit, for example, a computer located at user location 11-1 (also referred to hereinafter as just user 11-1), is shown in FIG. 2. In particular, user unit 11-1 includes computer (with a display—not shown) 200, selector 201 and conventional modem 202 for establishing an uplink path to IAP 50 via network 25. It also includes a conventional wireless Internet receiver 204 for receiving broadcasts transmitted by IAP 50 in the manner mentioned above. To establish a connection to IAP 50, a user operating computer 200 invokes a conventional telephony program which causes modem 203 to generate an alerting (e.g., off-hook) signal. When network 25 returns dial tone in response to the alerting signal and modem 203 detects the tone, it then outpulses the telephone number associated with IAP 50, which results in establishing a telephone connection between IAP 50 and user unit (modem 203) 11-1. At that point, an IAP 50 modem transmits a conventional carrier tone that is detected by modem 203 and prompts modem 203 to invoke a "handshake" session with the IAP 50 modem to establish particular operating parameters that will be followed in the transmission of data, e.g., the data rate. The telephony program displays a prompt on the computer 200 display when the handshake procedure is completed. At that point, the user may enter the address of a web/host site that the user desires to access. Computer 200, in turn, supplies the entry to selector 201 for routing to conventional modem 203. Modem 203 converts the user's digital entry into analog signals and transmits the analog signals over the established connection to IAP 50. Such connections include, for example, ISDN, CDPD, ADSL, HDSL, VDSL connections selected in accordance with a user's service subscription. For example, it is assumed herein that user 11-1 subscribes to plain old telephone service (POTS). Accordingly, then, the connection described above from modem 203 to IAP 50 would be a POTS connection. (However, that should not be construed as a limitation of the inventive access system, since, as mentioned immediately above, the connection could be digital connection, for example, an ISDN, CPDP, ADSL, HDSL or VDSL connection.) The IAP 50 modem (not shown) communicating with modem 203, in turn, converts the analog signals to digital signals and presents the result uplink to router 51. (In an illustrative embodiment of the invention, router 51 may be, for example, an Access Communication Processor (ACP), model ACP 70, available from Telematics International Inc., Fort Lauderdale, Fla.) Router 51, responsive to receipt of the user's entry, determines if the entry should be forwarded to Internet 100 or alternate proprietary service provider, e.g., America On-Line, 150, and prepends a respective routing flag thereto whose value is based on the result of the determination. Router 51 then supplies the entry to protocol converter 52, which may be, for example, either the CSMIM2 OR MOD-MIM communication service module available from Cabletron Systems, N.H. Protocol converter 52, in turn, reformats the entry to conform to either the TCP/IP protocol or a proprietary protocol specified by proprietary service provider 150 based on the content of the routing flag. For example, if the routing is all ones, then the reformatted entry is destined for Internet 100 and if alternating ones and zeroes, then it is destined for the alternate provider network 150. Protocol converter 52 also inserts in the reformatted entry, in place of the user's origination address, an address selected from a range of addresses associated with downlink path 57 and associates the address of the selected path with the address associated with user 11-1. Protocol converter 52 then supplies the user's address and address of the selected path to downlink protocol converter 53 via path 52-1. It is assumed that the user's entry is formatted in accord with the TCP/IP protocol and is then presented to Internet 100 for delivery in a conventional manner to the web/host site identified therein. Upon receipt of the reformatted entry, the web/host site processes it in a conventional manner by returning, for example, a copy of the site's pre-defined home page, to a return address contained in the received entry via Internet 100, in which the return address is associated with the downlink path 57 connected to a particular data port of protocol converter 53. As is well-known, it is likely that the web/host site transmits the data forming its home page over a number of data packets, rather than just one data packet. Upon receipt of each of the data packets carrying data respectively defining different sections of the aforementioned home page, converter 53, which may be, for example, the above-mentioned communication server module from Cabletron, changes the destination address in each such received packet to the address associated with user 11-1 and then forwards the packet to conventional packetizer 54. Packetizer 54, which may be a computer/processor arranged to implement a particular packet formatting protocol, for example, the ATM Adaptation Layer (AAL) protocol, slices a packet that it receives from protocol converter 53 into a number of smaller packets and prepends a conventional header to each such smaller packet and supplies each such packet as it is formed to scheduler 55. Scheduler 55, which may be, for example, a computer that implements a particular scheduling algorithm, queues the packets in the order that they are received from packetizer 54. Scheduler 55 then determines, based on quality of service parameters respectively associated with the stored packets, the order in which the packets are to be delivered to respective destinations via digital broadcast radio operating in a particular spectrum of frequencies, e.g., the spectrum of frequencies defining television channels 60–69. For example, the stored packets may be processed in round-robin order based on the aforementioned quality-of-service parameters as discussed in the article entitled "Queuing Disciplines and Passive Congestion Control in Byte-Stream Networks" by S. P. Morgan, published Proceedings of IEEE Conference on Computer Communications (INFOCOM '89), Ottawa, Canada, May 24,1989, which is incorporated herein by reference in its entirety. It is noted that, in an alternative embodiment of the invention, the response from the Internet may be supplied directly to scheduler 55 for delivery to the user, thereby making converter 53 and packetizer 53 optional.

When the packets destined for user 11-1 are scheduled for transmission thereto, scheduler 55 unloads the packets from the queue and supplies them in proper sequence to conventional digital broadcast transmitter 56, which modulates the data forming the packet with the above mentioned TV signals and transmits the result over antenna 58 in a conventional manner. As mentioned above, the users within the coverage served by antenna 58 receive the broadcast, but only the addressee accepts the signal. That is, wireless Internet receiver 204 receives the broadcast signal via its associated antenna 12-1 and demodulates the signal to recover the transmitted data packet. It then accepts the packet if the destination address contained therein is assigned to unit 11-1. Accepted data packets are then supplied to computer 200 via selector 201. Computer 200, in turn, displays the data carried in the packet payload. A user's entry noting, for example, a selection of a particular displayed menu item or button, is then supplied to IAP 50 in the manner discussed above. IAP 50 then supplies the entry to the identified web/host site and returns responses received from the web to the use in the manner discussed above.

It is seen from FIG. 2 that the access system includes "other" service 300, which may be, for example, a public emergency system, which may use the broadcast capabilities of provider 50, in a point to point fashion, to broadcast emergency information, e.g., an address, to a particular point, e.g., a fire house.

An illustrative embodiment of the invention arranged to interface mobile data terminals, e.g., personal computers and the like, with the Internet is shown in FIG. 3. Elements common to FIGS. 2 and 3 are similarly designated. Specifically, as mentioned above, a user entry, after it has been processed by a computer program (running on computer 401 within mobile unit 14-1) that the user invokes to access the Internet, supplies the entry in a form compatible with a particular format/protocol, e.g., the well-known IEEE 802.3 MAC frame format via selector 402 to a conventional wireless modem 403 which then modulates the entry using a predetermined carrier signal and then transmits the modulated result to conventional wireless base station 75 via antenna 61-1. Base station 75, in turn inserts its TCP/IP address in the entry and then routes the result via an idle path 76 to router 51-1. Router 51-1 in the manner described above processes the entry and supplies it to protocol converter 52. Converter 52 processes and then transmits the entry to the identified web/host site via Internet 100 (or to the proprietary service provider as the case may be) in the manner discussed above. In addition, converter 52 supplies to location manager 57 an identifier assigned to the originator of the entry and also a return address of the TCP/IP message sent to the identified web/host site. Location manager 57, which may be, for example, a conventional computer/processor, associates the user's MAC address with one of the antennas 58-i, e.g., antenna 58-1, and stores that information along with the above-mentioned TCP/IP return address in a queue associated with protocol converter 53.

As discussed above, upon receipt of each of the data packets carrying data respectively defining different sections of the aforementioned home page, converter 53 changes the destination address in each such received packet to the address associated with the originating user 14-1 and then forwards the packet along with above-mentioned antenna address to router 51-2. Router 512 then supplies the packet to either packetizer 54-1 or packetizer 54-2 based on the antenna 58 address accompanying the packet. In accord with the present illustrative example, the packet would be supplied to packetizer 54-1 which is in the supply path extending to antenna 58-1 whose transmissions serve the coverage area in which the identified user unit is located. As discussed above, packetizer 54-1, in accordance with a predetermined protocol format, slices a packet that it receives from protocol converter 53 into a number of smaller packets and prepends a conventional header to each such smaller packet and supplies each such packet as it is formed to scheduler 55-1, which, as discussed above, then schedules the transmission of the packet over antenna 58-1. Scheduler 55-1, which may be, for example, a computer that implements a particular scheduling algorithm, queues the packets in the order that they are received from packetizer 54-1. At the scheduled point in time, scheduler 55-1 supplies the packet to transmitter 56-1 for transmission via antenna 58-1 in a conventional manner. That is, as mentioned above, transmitter 56-1 modulates the data forming the packet with the above mentioned TV signals and transmits the result over antenna 58-1 in a conventional manner. As also mentioned above, the users within the coverage area served by antenna 58-1 (e.g., users 14-1 through 14-N) receive the broadcast, but only the addressee accepts the signal. That is, each of the wireless Internet receivers 404 of respective units 14-1 through 14-N receive the broadcast signal via its associated broadcast-receive antenna 16-2 and demodulates the signal to recover the transmitted data packet. However, only the receiver whose associated address (e.g. MAC address) is contained in the packet accepts the packet and supplies it to its associated computer 401. It is noted that if the user and/or base station address were located in coverage area 15-2, then the aforementioned packet would have been routed to the path comprising packetizer 54-2, scheduler 55-2 and transmitter 56-2 and thence to antenna 58-2 for transmission to coverage area 15-2.

It can be appreciated that a mobile user could relocate to another base station while the Internet is being accessed on the behalf of that user. To deal with that possiblilty, location manager 57 may be arranged to track the location of such a mobile unit. In this way, a response received from Internet 100 may be routed to the appropriate broadcast antenna 58-i serving the coverage area in which the mobile unit is now located. One method of tracking mobile units which are free to roam from one location to another is disclosed in the article entitled "Simplified Routing for Mobile Computers using TCP/IP" by C. E. Perkins published Proceedings IEEE Conference on Wireless LAN Implementation, November, 1992, which is hereby incorporated in its entirety by reference.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A system for interfacing wireless user apparatus with a data network interconnecting a plurality of host sites identified by respective network addresses, said system comprising receiver means for receiving a request originated by said wireless user apparatus and forwarding the received request to said system via an upstream link for delivery to one of said host sites identified in said request, said request including a request for particular information supplied by said one of said host sites, a fist controller for receiving said request from said upstream link, and for (a) reformatting said request into a form recognized by said data network and including in said reformatted request a return address identifying a particular, independent downstream link formed from a transmission media independent of the upstream link, (b) supplying the resulting reformatted request to said network for delivery to said one host site, and (c) supplying to a second controller interfacing with said independent downstream link information associating the latter link with a particular address that indirectly identifies a particular transmission coverage area in which the wireless user is located, said second controller, operative upon receipt of a response from said one host site, associates the received response with said particular address and reformats said response in accordance with a predefined protocol, and transmission means selected as a function of said particular address for transmitting the reformatted response directly to the wireless user apparatus via the downstream link.

2. The system of claim 1 wherein said transmission means is one of a plurality of transmission apparatuses associated with respective transmitting antennas serving respective coverage areas, and wherein said function is based on identifying the coverage area in which said wireless user apparatus is located at the time of receiving said information via said uplink.

3. The system of claim 1 wherein said particular address is a TCP/IP address.

4. The system of claim 1 further comprising a wireless base station connected to said upstream link, wherein said wireless user apparatus is a wireless data terminal which transmits said request in modulated form to said base station, said base station including demodulation apparatus to recover said request, insert said TCP/IP address in the said recovered information and supply the resulting request to said upstream link, said TCP/IP address being associated with said base station rather than with said wireless data terminal.

5. The system of claim 4 wherein the wireless data terminal is a mobile wireless data terminal.

6. The system of claim 1 further comprising scheduling apparatus operative for scheduling the transmission of said reformatted response in accordance with a particular level of quality of service associated with said user apparatus, said particular level of quality of service being identified as a function of an address assigned to said wireless user apparatus and contained in the request originated by the wireless user apparatus.

7. The system of claim 1 wherein the selected transmission apparatus transmits the reformatted response over a predetermined spectrum of frequencies.

8. The system of claim 7 wherein said spectrum of frequencies is at least one predetermined television channel selected from the group of television channels comprising channels 64 through 69.

* * * * *